United States Patent [19]
Huelskamp et al.

[11] 3,911,142
[45] Oct. 7, 1975

[54] PROCESS FOR PREPARING A PROTEIN SNACK FOOD AND THE RESULTING PRODUCT

[76] Inventors: Henry J. Huelskamp, 724 S. Clifton, Park Ridge, Ill. 60068; John J. Collins, 1214 S. Ridge Ave., Arlington Heights, Ill. 60005; James E. Devero, 119 N. Windsor Drive, Arlington Heights, Ill. 60004

[22] Filed: Sept. 28, 1973

[21] Appl. No.: 401,667

[52] U.S. Cl. ............... 426/559; 426/560; 426/622; 426/625; 426/637; 426/656; 426/443; 426/808
[51] Int. Cl.² .......................................... A23L 1/18
[58] Field of Search .......... 426/141, 145, 146, 342, 426/345, 343, 152, 153, 808

[56] References Cited
UNITED STATES PATENTS

| | | | |
|---|---|---|---|
| 2,738,277 | 3/1956 | Cryns | 426/146 |
| 3,185,574 | 5/1965 | Gabby et al. | 426/152 |
| 3,282,701 | 11/1966 | Wong et al. | 426/345 |
| 3,539,356 | 11/1970 | Benson et al. | 426/152 |
| 3,600,193 | 8/1971 | Glabe et al. | 426/152 |
| 3,697,290 | 10/1972 | Lynn | 426/345 X |

Primary Examiner—Raymond N. Jones
Attorney, Agent, or Firm—Laff, Whitesel & Rockman

[57] ABSTRACT

A ready-to-eat snack food product which is high in protein content and contains soy protein, wney and potato flakes. The product results from a critical sequence of processing steps.

9 Claims, No Drawings

PROCESS FOR PREPARING A PROTEIN SNACK FOOD AND THE RESULTING PRODUCT

BACKGROUND OF THE INVENTION

The recent trend to scarcity and inordinately high prices of meat has accelerated the need for protein in other forms. Soy beans are extremely rich in protein but do not respond readily to incorporation in appetizing food products. Soy beans alone in cooked form will cloy the average taste and, to gain variety, there have been many attempts to overcome these shortcomings. For example, some workers in the field have tried to produce a flaked cereal from soy beans alone but there is insufficient starch or other binder to cohere the particles. In order that a snack-type wafer will be resistant to crumbling, cohesiveness of the finished product is a paramount factor. If too much liquid is added the raw mass becomes sticky and unmachinable during processing.

SUMMARY OF THE INVENTION

The invention resides in a process and the product thereof utilizing soy protein, whey, dry milk, wheat flour, potato flavor e.g. in the form of flakes, sodium bicarbonate, sodium potassium tartrate, vitamin concentrates and water, and mixing these dry ingredients thoroughly before adding water to bind the mass. This mixture is blended with part of the water and permitted to rest for a period of time sufficient for hydration of the mass through to the interior. The remaining water is added subsequently and as rapidly as possible.

The formulation may be expressed in broad terms as follows:

|  | Range – % |
|---|---|
| Soy protein (at least 70% protein) | 15–50 |
| Whey powder | 10–17 |
| Non-fat dry milk | 10–50 |
| Wheat flour | 7–15 |
| Potato Flakes | 7–15 |
| Flavoring | 1–3 |
| Sodium bicarbonate | 0.2–0.3 |
| Sodium potassium tartrate | 0.2–0.3 |
| Water | 20–30 |
| Vitamin concentrate | plus |

The initial step of the mixing process comprises dry blending of the soy, whey, non-fat dry milk, flour, potato flakes, sodium bicarbonate, sodium potassium tartrate and vitamin concentrate for 10 minutes. Since the soy, whey, milk, flour and potato would not form a homogeneous hydrated mass if water were added without the particles of each material being thoroughly separated from the others it is necessary that the mode in which such separation is accomplished and the time, become a critical factor. This pre-blending of the dry ingredients is so critical that an acceptable product is impossible without it.

Following blending of the dry ingredients 75% of the water is added and incorporated into the mass. This composite is left to stand for 20 minutes to permit hydration through and through. If this is not done the mass will continue to hydrate in the forming and cooking processes with consequent failure to produce an acceptable product.

After it has been determined that the first addition of water has penetrated the entire mass, the remaining 25% is added, which brings the mass to a condition of uniform stability. The remaining water is added rapidly e.g. 30 seconds, since prolonged mixing at this point of time will render the mass sticky and unmachinable.

Forming of the product to the desired shape and character may be accomplished by any of the following procedures:

I. SHEETING.
  a. The dough mass is passed through a series of Teflon-coated, steel reduction rolls to a thickness of 0.012 to 0.017 inch and cut into the desired shape either by stamping or the use of rotary rolls.
  b. If, during the cutting stage, small holes are punched into the shaped product, the product will be flat and have pillows between the holes.
  c. If, during the cutting stage, holes are not cut, the product will be one large pillow.

II. EXTRUSION.
  a. The mass can be extruded through a non-thermal extruder and cut at the delivery end plate, to a thickness and length depending upon the final configuration desired.
  b. The mass can be extruded through a thermal cooker operating at about 250° F. and cut as in II.a.

Imparting stability for transportation and consumption may be accomplished in the following ways:

III. BAKING.
  a. The product of I.a, I.b or I.c can be baked on a wire belt or solid steel band at a temperature of 450° F. for 2 minutes and then at 350° F. for 2 minutes. At this point the color of the product is golden brown and the moisture content is 10–12%. It is then passed through a drying chamber operating at 72° F. for 8 to 10 minutes whereby the moisture content is reduced to 2–4% which imparts brittleness and greater resistance to fracture. It is to be noted that these conditions of brittleness and resistance to fracture cannot be attained in the baking process because of the high percentage of lactose.
  b. Other flavorings may be applied to the product prior to entry into the baking chamber.

IV. AIR DEHYDRATION.
  a. The partially-prepared product resulting from II.a is injected into an air dehydration chamber operating at a temperature of approximately 700° F. and the partially-prepared product is toasted for 1½ minutes. The final product is puffy and golden brown and has a final moisture content of 2–4%. (Flavor additions, if any, may be made to the dough mass.)
  b. The partially prepared product resulting from II.b is injected into an air dehydration chamber operating at approximately 600° F. and toasted for from ¾ to 1 minute. The final product is puffy, golden brown and has a moisture content of 2 to 4%.

V. FRYING.
  a. The respective products of I.a, II.a and II.b can be fried in vegetable fat at 385° F. for the following periods: I.a—½ minute; II.a—4 minutes; II.b—2 minutes. These products will have a cellular interior and a golden crust.

The final analyses are:
BAKED — III.a and b
AIR DEHYDRATION — IV.a and b

|  | % |
|---|---|
| Carboyhydrate | 52.75 |
| Protein | 35.50 |
| Fiber | 5.00 |
| Moisture | 4.00 |
| Minerals | 2.00 |
| Fat | 0.75 |
| Vitamins | plus |
|  | 100.00% |

FRIED - V.a

|  | % |
|---|---|
| Carbohydrate | 42.06 |
| Protein | 28.44 |
| Fiber | 4.00 |
| Moisture | 3.00 |
| Minerals | 1.75 |
| Fat | 20.75 |
| Vitamins | plus |
|  | 100.00% |

A preferred formula for the dough is:

|  | % |
|---|---|
| Soy protein | 16.67 |
| Whey powder | 16.67 |
| Non-fat dry milk | 16.67 |
| Wheat flour | 10.00 |
| Potato flakes | 10.00 |
| Flavor (various) | 2.00 |
| Sodium bicarbonate | 0.25 |
| Sodium potassium tartrate | 0.25 |
| Water | 27.49 |
| Vitamin concentrate | plus |
|  | 100.00% |

For soy protein an acceptable product is a concentrate sold by Griffith Laboratories, Chicago, under No. GL-301. This product contains 70% protein and 1% fat.

An acceptable whey powder is KRAFEN available from Kraftco, Chicago. This product is a non-hydroscopic food grade powder resulting from the drying of fresh cheese whey.

Any commercial non-fat dry milk has been found suitable.

For the flour, any common bread flour, either spring or winter wheat, with a protein level of 10 – 14% may be used.

The potato flakes are available from many sources and comprise principally dehydrated mashed potatoes.

Vitamins may be incorporated in the form of commercial tablets commonly used as a supplement in baked food products.

When a salted final product is desired, extra coarse salt is sprinkled prior to placing in the first oven while the dough mass is still moist.

We claim:

1. The process of making a protein snack food product having a high protein content comprising the steps of:
   a. dry mixing:

|  | Range – % |
|---|---|
| Soy protein (having at least 70% protein) | 15–50 |
| Whey powder | 10–17 |
| Non-fat dry milk | 10–50 |
| Wheat Flour | 7–15 |
| Potato Flakes | 7–15 |
| Sodium bicarbonate | 0.2–0.3 |
| Sodium potassium tartrate | 0.2–0.3 |
| Water | 20–30 | b. adding water to the mix in sufficient amount to form a hydrated mass and bind said mass;
   c. allowing the hydrated mass to rest for a sufficient time after the addition of water in step (b) to insure uniform dispersion of the water through to the interior of the mass;
   d. rapidly adding more water to the mass to bring the mass to a condition of uniform stability;
   e. shaping the mass into pieces of substantially the desired final configuration; and
   f. subjecting the pieces to heat for a period of time sufficient to produce the desired product.

2. The process in accordance with claim 1 in which the additions of water at steps (b) and (d) are in the ratio of approximately 3 to 1 by volume.

3. The process in accordance with claim 1 in which the respective quantities of soy protein, whey, dry milk, flour and potato flakes are by weight:

|  | % |
|---|---|
| Soy protein | 16.67 |
| Whey powder | 16.67 |
| Non-fat dry milk | 16.67 |
| Wheat flour | 10.00 |
| Potato flakes | 10.00 |

4. The process in accordance with claim 1 in which the quantity of water is substantially 27.49% of the whole by weight.

5. The process in accordance with claim 1 wherein step (f) comprises baking the pieces on a mesh support at a temperature of substantially 450° for a period of substantially 2 minutes followed by a temperature of substantially 350° for a period of substantially 2 minutes.

6. The process in accordance with claim 5 characterized by the additional step of air drying at substantially 72° for a period of from 8 to 10 minutes.

7. The process in accordance with claim 1 in which step (f) comprises frying the pieces in fat at a temperature of substantially 385° F. for a period from ½ to 4 minutes.

8. The process of claim 1 further characterized by the additional step following step (f) of dehydrating the pieces at a temperature of from 600° to 700° F. for a period of time ranging from ¾ to 2 minutes to yield a final product having a moisture content of from 2 to 4%.

9. The product made by the process of claim 1.

* * * * *